H. J. BARNHART.
STEERING GEAR FOR REVOLVING STEAM SHOVELS.
APPLICATION FILED SEPT. 4, 1915.

1,214,264.  
Patented Jan. 30, 1917.
2 SHEETS—SHEET 1.

INVENTOR:
Harry J. Barnhart,
By Huron Hall, Atty.

H. J. BARNHART.
STEERING GEAR FOR REVOLVING STEAM SHOVELS.
APPLICATION FILED SEPT. 4, 1915.

1,214,264.

Patented Jan. 30, 1917
2 SHEETS—SHEET 2.

UNITED STATES PATENT OFFICE.

HARRY J. BARNHART, OF MARION, OHIO, ASSIGNOR TO THE OSGOOD COMPANY, OF MARION, OHIO.

STEERING-GEAR FOR REVOLVING STEAM-SHOVELS.

1,214,264.  Specification of Letters Patent.  Patented Jan. 30, 1917.

Application filed September 4, 1915. Serial No. 49,007.

*To all whom it may concern:*

Be it known that I, HARRY J. BARNHART, a citizen of the United States, residing at Marion, in the county of Marion and State of Ohio, have invented certain new and useful Improvements in Steering-Gears for Revolving Steam-Shovels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of excavating machines in which a wheeled truck carries a horizontally revoluble platform or turn-table upon which is mounted the excavating machinery and the devices for rotating the platform upon the truck. The mechanisms for propelling and for steering the machine are mounted upon or under the truck and are operatively connected with a steam engine or other motor mounted on the platform.

My invention relates more particularly to such steering mechanism, as well as to means for holding the revoluble platform steady upon its truck during the shifting of the machine.

The object of my invention is to provide a screw controlled means for actuating the steering axle of the truck, whereby this axle shall at all times be rigidly held against the loose horizontal vibration jar and clatter which, during the shifting of the machine, accompany such axles as usually constructed, and whereby the durability and efficiency of the truck and the steering mechanism are enhanced.

A further object of my invention is to make provision for connecting my steering device with a driving means mounted upon the rotary platform when such platform is turned either forwardly or backwardly.

My invention is also designed to furnish a locking device which will lock the platform when turned either to the front or rear, thus, in either position, presenting and holding the steering motor in proper relation to the steering gears during the shifting of the machine.

I attain these objects by means of the devices, construction and arrangement of parts hereinafter described, and shown and illustrated in the accompanying drawings in which—

Figure 1:
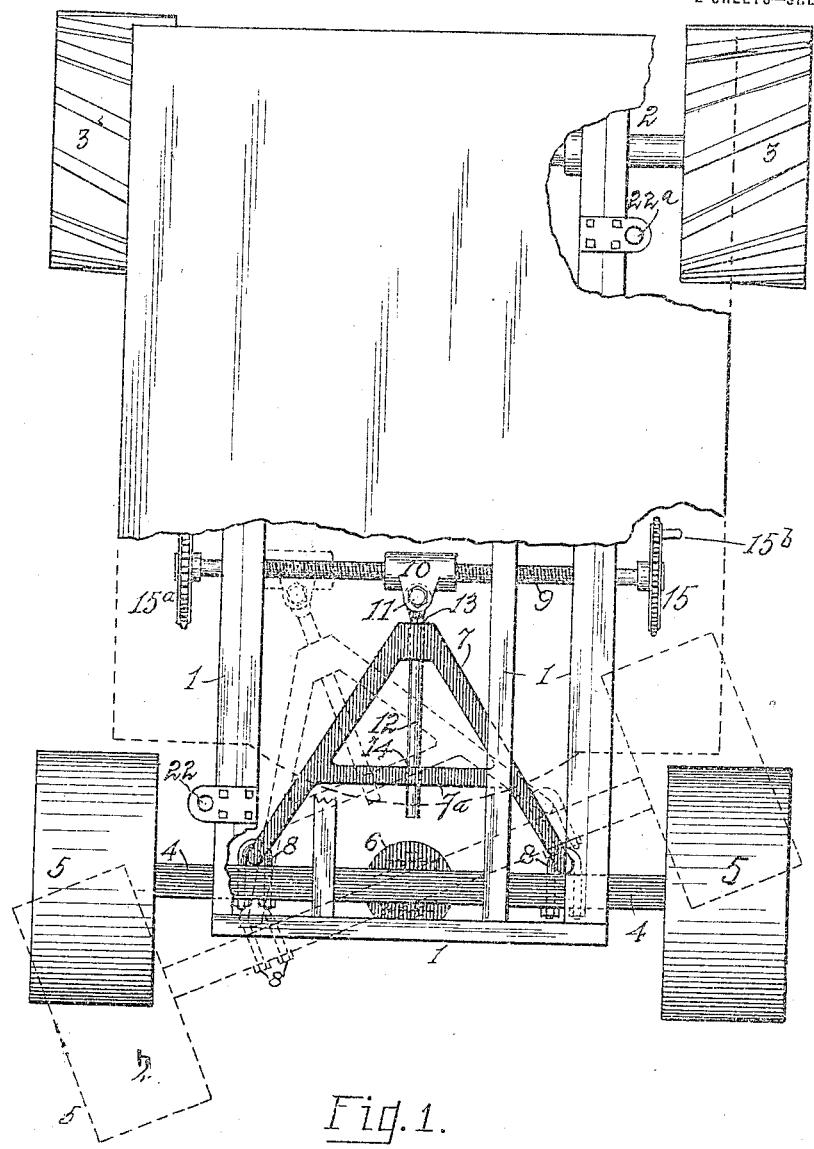
Figure 2:
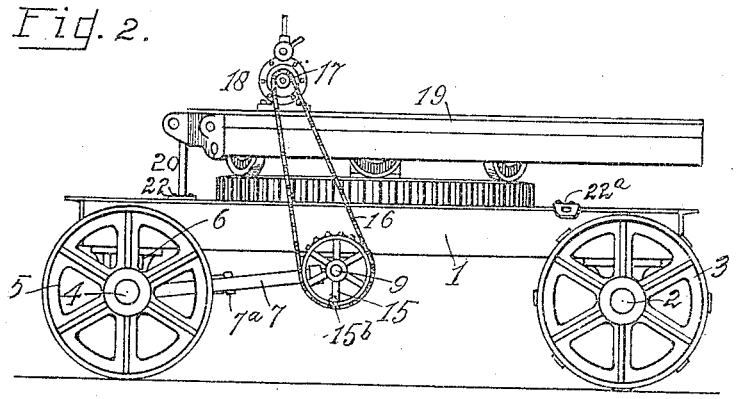
Figure 3:
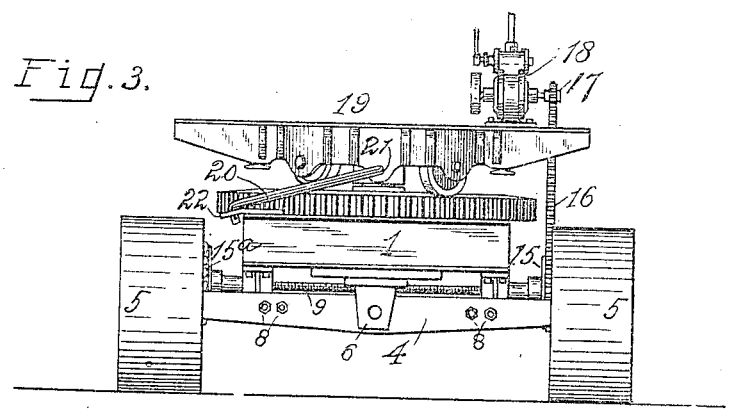

Figure 1 is a top-plan-view of the truck hereinafter referred to with parts of its deck broken away and with a portion of the bolster hereinafter referred to removed; Fig. 2, a side-elevation of said truck with a turn-table mounted thereon and with a steering engine mounted on the turn-table, and Fig. 3, a front-end-view of the same.

Like numerals represent like parts throughout the drawings.

In the drawings 1 is a truck-frame of the usual or any preferred construction having a rear axle 2 provided with driving wheels 3 3. The driving mechanism for the wheels forms no part of the present invention and need not be here described as it may be of any well known sort. The front axle 4, having its ends operatively mounted in the front wheels 5, has at its middle a bolster 6 which supports the forward end of the frame and upon which the axle may turn horizontally and may vertically rock to a limited extent. A stout horizontal broadened A-shaped frame 7, which may be regarded as a steering lever, has,—by way of illustration of a suitable connection,—the extremities of its legs hooked into staples 8 passing through the axle 4 about midway between the bolster and the wheels. Journaled upon the under side of the side-members of the truck-frame is a shaft 9, threaded a suitable distance along its middle portion, the threaded portion carrying and being engaged with an internally threaded sleeve 10. This sleeve is pivotally connected, as at 11, with one end of a stout rod or bar 12 which passes with a sliding fit through a horizontal aperture 13 in the apex of the A-shaped member 7 and through a like aperture 14 in the middle of the cross-bar 7ª of said member. At the opposite ends of the shaft 9 are secured sprocket-wheels 15—15ª adapted to be connected by sprocket-chain 16 with a sprocket-wheel 17 on the shaft of a small reversible engine 18 mounted upon the turn-table 19 near its edge. When the turn-table is turned forwardly the two sprockets 15—17 are in such relative position as to receive the chain 16. When the turn table is turned in the opposite direction the sprockets 15ª—17 may in like manner be connected. Thus the machine may be steered by my device regardless of whether the turn-table is positioned forwardly or backwardly. By means of handles 15ᵇ on sprockets 15 the steering gear may be operated manually.

The operation of my steering gear thus far described is as follows: Motion being given to the shaft 9 through the engine the sprockets and their connecting chain, the sleeve 10 is, through its threaded connection with the shaft, caused to traverse the shaft to the right or left, depending upon the direction given to the reversible engine. This movement of the sleeve 10 now by means of the lateral stress of the bar 12 causes the frame 7 to swing horizontally carrying with it and giving positive corresponding motion to the steering axle and wheels. The legs of the frame 7 as they swing to and fro act alternately as tension and compression members. The sliding of the bar 12 in its bearings 13—14 accommodates the variable distance between sleeve 10 and the axis of movement of the steering axle, as shown in dotted lines in Fig. 1.

Since any rotary movement of the turn-table while the above described devices are in operation would be likely to injure or break a sprocket or chain I provide a lock against such movement of the turn table, which lock, in the present instance, for illustration, consists of a bar 20, turned at each end as a hook. In the turn table is an eye 21 adapted for the reception of one of the hooks. Upon the truck are two eyes 22—22ᵃ each adapted for engagement with the other hook. When the turn table is turned forwardly the bar 20 is engaged with eyes 21—22 and when the turn table is turned backwardly the bar is engaged with the eyes 21—22ᵃ, thus utilizing one bar and a minimum number of eyes for locking the table in either of the two desired positions.

Having described my invention, what I claim and desire to secure by Letters Patent, is—

1. In a device of the described character, a truck, a platform mounted to turn either forwardly or backwardly on the truck, a steering axle for the truck, a steering gear mounted on the truck for the control of the axle, an engine on the platform, said gear and said engine being relatively positioned for operable connection in either of said positions of the platform, and detachable means for connecting said engine and said gear in either of said positions, combined with means for locking said platform to said truck in either of said positions.

2. In a device of the described character, a truck, a horizontally revoluble body on the truck, a steering axle for the truck, a shaft journaled across the truck and projecting beyond the sides of the body, steering connections between the shaft and the axle, an engine on the body, detachable means for operatively connecting said engine with a projecting end of said shaft, and means for locking the body against turning while said engine is thus connected.

3. A truck, a platform horizontally revoluble upon the truck, means for locking the platform against such rotation, steering wheels for the truck, and means supported by the platform for operating the steering wheels when the truck and platform are held stationary relatively to each other.

4. A truck, a revolving platform mounted thereon, a pivoted steering axle for the truck, a shaft journaled on the truck frame, a connection between the shaft and axle whereby the rotation of the shaft controls the axle, combined with manually operated means and engine driven means for rotating said shaft.

5. A truck, a revolving platform mounted thereon, a pivoted steering axle for the truck, a shaft journaled on the truck frame, a connection between the shaft and axle whereby the rotation of the shaft controls the steering axle, a driving gear at each end of the shaft and means for actuating either of said gears.

6. A truck comprising a frame with traction wheels supporting one end and steering wheels the opposite end, a revolving platform mounted thereon, a shaft journaled on the truck frame with its end extended beyond the frame, a connection between the shaft and axle whereby the rotation of the shaft controls the axle, an engine located on the revolving platform and detachable driving means connecting said engine and the extended end of the shaft.

7. A truck comprising a frame with traction wheels supporting one end and steering wheels supporting the opposite end, a steering gear mounted on the truck, a revolving platform mounted on the truck, an engine located on the platform, detachable means for connecting the engine with said steering mechanism just outside the truck frame, when the truck and revolving body are relatively at rest.

8. A truck, a steering mechanism therefor, a revolving platform mounted on the truck, an engine on the platform, means for locking the platform to the truck, and means connecting the engine on the platform to said steering mechanism.

9. A truck, a platform mounted to turn either forwardly or backwardly on the truck, means for locking the platform in either of said positions, a steering gear on the truck, an engine on the platform, and means for detachably connecting said engine with said steering mechanism when the truck and platform are locked together.

10. A truck, a platform horizontally revoluble upon the truck, an engine mounted upon the platform, a pivoted steering axle on the truck, a shaft journaled on the truck, a connection between the shaft and axle whereby the rotation of the shaft controls the steering axle, and a detachable driving-chain connection between the engine on the platform and the shaft on the truck.

11. In a steam shovel, the combination with a swinging body, a truck-frame on which said body is mounted to swing horizontally, traction wheels supporting one end of said truck-frame, and steering wheels supporting the opposite end of the track-frame and mounted to swing in a substantially horizontal plane, of mechanism for manually turning the steering wheels, said mechanism embodying a lever connected with the steering axle and a transverse screw journaled in the truck frame and having a handle thereon; a reversible steering engine on the body, a detachable driving connection between said screw and said engine, and means for locking the swinging body against movement on the truck-frame when the screw is connected with the engine for steering the shovel.

In testimony whereof I affix my signature in presence of two witnesses.

HARRY J. BARNHART.

Witnesses:
  W. B. LONG,
  V. M. HALL.